United States Patent
Yoo et al.

(10) Patent No.: US 9,716,828 B2
(45) Date of Patent: Jul. 25, 2017

(54) METHOD FOR SHOOTING IMAGE AND ELECTRONIC DEVICE THEREOF

(71) Applicant: Samsung Electronics Co., Ltd., Suwon-si, Gyeonggi-do (KR)

(72) Inventors: Sang-Hyeon Yoo, Suwon-si (KR); Sung-Dae Cho, Yongin-si (KR); Dae-Sung Kim, Suwon-si (KR); Jung-Ik Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 14/263,228

(22) Filed: Apr. 28, 2014

(65) Prior Publication Data

US 2015/0062289 A1    Mar. 5, 2015

(30) Foreign Application Priority Data

Aug. 28, 2013 (KR) ........................ 10-2013-0102473

(51) Int. Cl.
*H04N 5/253*   (2006.01)
*H04N 5/232*   (2006.01)

(52) U.S. Cl.
CPC ..... *H04N 5/23238* (2013.01); *H04N 5/23216* (2013.01)

(58) Field of Classification Search
None
See application file for complete search history.

(56) References Cited

U.S. PATENT DOCUMENTS

| 2005/0195216 | A1* | 9/2005 | Kramer | G06F 3/14 345/619 |
| 2006/0192879 | A1* | 8/2006 | Hisamatsu | H04N 5/23245 348/333.01 |
| 2011/0026480 | A1* | 2/2011 | Kim | H04B 7/0413 370/329 |
| 2011/0026840 | A1* | 2/2011 | Tao | G06K 9/00684 382/224 |
| 2011/0214072 | A1* | 9/2011 | Lindemann | G01C 11/02 715/757 |
| 2012/0194637 | A1* | 8/2012 | Han | H04N 5/23232 348/36 |

(Continued)

FOREIGN PATENT DOCUMENTS

KR  10-2012-0074493 A  7/2012

*Primary Examiner* — David N Werner
*Assistant Examiner* — Tyler W Sullivan
(74) *Attorney, Agent, or Firm* — Jefferson IP Law, LLP

(57) ABSTRACT

An apparatus and a method for performing spherical panorama shooting in an electronic device are provided. The method includes, displaying, if it is determined that the electronic device is positioned in an outdoor environment, a first summary guide corresponding to the outdoor environment, and displaying, if it is determined that the electronic device is positioned in an indoor environment, a second summary guide corresponding to the indoor environment. The first summary guide and the second summary guide are graphic User Interfaces (UI) for informing a spherical panorama shooting progress, and the second summary guide has a number of image shootings that are required for generating a spherical panoramic image, different from the number of image shootings in a case where the first summary guide is displayed.

21 Claims, 13 Drawing Sheets

(56) References Cited

U.S. PATENT DOCUMENTS

| | | | |
|---|---|---|---|
| 2012/0242783 A1* | 9/2012 | Seo | H04N 5/23238 348/36 |
| 2014/0270692 A1* | 9/2014 | Suzuki | H04N 9/87 386/230 |
| 2014/0362176 A1* | 12/2014 | St. Clair | H04N 5/23238 348/36 |
| 2015/0154793 A1* | 6/2015 | Ofstad | G06F 3/0481 345/427 |

* cited by examiner

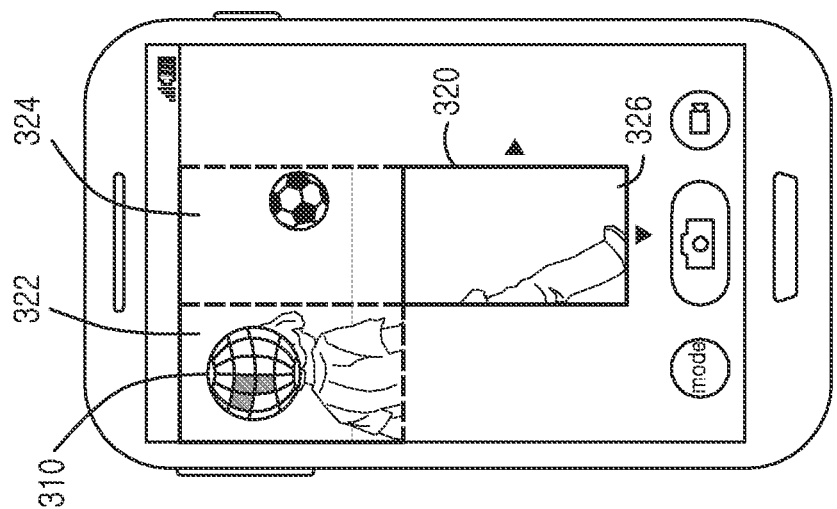
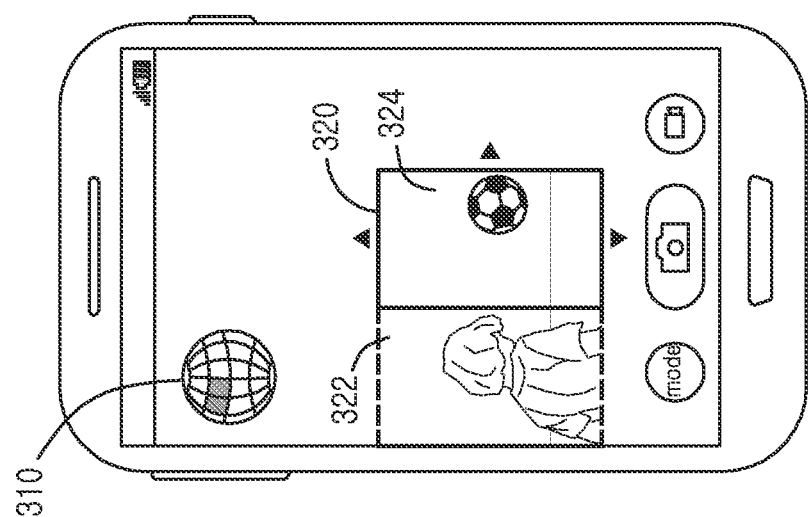
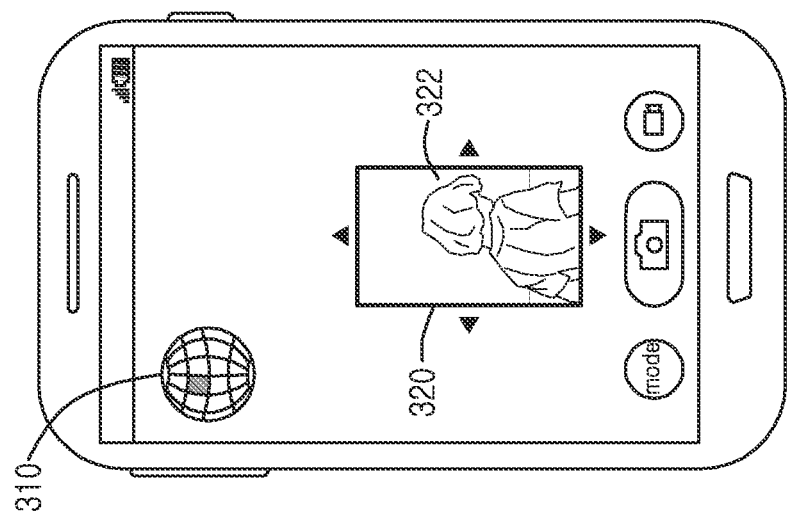

METHOD FOR SHOOTING IMAGE AND ELECTRONIC DEVICE THEREOF

CROSS-REFERENCE TO RELATED APPLICATION(S)

This application claims the benefit under 35 U.S.C. §119 (a) of a Korean patent application filed on Aug. 28, 2013 in the Korean Intellectual Property Office and assigned Serial number 10-2013-0102473, the entire disclosure of which is hereby incorporated by reference.

TECHNICAL FIELD

The present disclosure relates to a method of image shooting and an electronic device thereof.

BACKGROUND

A panoramic image denotes a combined image generated by connecting a series of images shot in a plurality of directions. The panoramic image allows an observer to be immersed in a more realistic image by providing a wider field of vision with respect to a scene around a photographer compared to one image shot in one direction.

A panoramic image may be classified into a plane panoramic image, a spherical panoramic image, etc. The plane panoramic image is obtained by combining a plurality of images on a plane, and the spherical panoramic image is obtained by combining a plurality of images on a sphere in order to configure an image where the plurality of images are disposed at the same distance around an observer. When the spherical panoramic image is used, more realistic and various services may be provided. For example, the spherical panoramic image is used for a service such as a street view in an Internet map search service.

Panoramic image shooting requires a plurality of image shootings. Accordingly, an electronic device having a panorama shooting function provides a User Interface (UI) informing a shooting state, for convenience of a user, generally. In case of a conventional spherical panorama shooting, a spread guide informing a shooting state consists of divided planes divided on a predetermined direction angle basis. Also, an image being shot is positioned on the spread guide.

Accordingly, an apparatus and a method for shooting a spherical panoramic image in an electronic device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for shooting a spherical panoramic image in an electronic device.

Another aspect of the present disclosure is to provide an apparatus and a method for displaying a shooting progress state during spherical panoramic image shooting in an electronic device.

Another aspect of the present disclosure is to provide an apparatus and a method for displaying a shot portion and a non-shot portion during spherical panoramic image shooting in an electronic device.

Another aspect of the present disclosure is to provide an apparatus and a method for displaying a shooting progress state via a more easily understandable User Interface (UI) during spherical panoramic image shooting in an electronic device.

Another aspect of the present disclosure is to provide an apparatus and a method for adjusting the number of shootings depending on an environment during spherical panoramic image shooting in an electronic device.

Another aspect of the present disclosure is to provide an apparatus and a method for discriminating an indoor space and an outdoor space during spherical panoramic image shooting in an electronic device.

In accordance with an aspect of the present disclosure, a method for operating an electronic device is provided. The method includes, displaying, if it is determined that the electronic device is positioned in an outdoor environment, a first summary guide corresponding to the outdoor environment, and displaying, if it is determined that the electronic device is positioned in an indoor environment, a second summary guide corresponding to the indoor environment. The first summary guide and the second summary guide are graphic User Interfaces (UI) for informing a spherical panorama shooting progress, and the second summary guide has a number of image shootings that are required for generating a spherical panoramic image, different from the number of image shootings in a case where the first summary guide is displayed.

In accordance with another aspect of the present disclosure, an electronic device is provided. The electronic device includes a processor configured to control displaying a first summary guide corresponding to an outdoor environment if it is determined that the electronic device is positioned in the outdoor environment, and control displaying a second summary guide corresponding to an indoor environment if it is determined the electronic device is positioned in the indoor environment, and a display unit configured to display one of the first summary guide and the second summary guide under control of the processor. The first summary guide and the second summary guide are graphic User Interfaces (UI) for informing a spherical panorama shooting progress, and the second summary guide has a number of image shootings that are required for generating a spherical panoramic image, different from the number of image shootings in a case where the first summary guide is displayed.

In accordance with still another aspect of the present disclosure, an electronic device is provided. The electronic device includes a memory configured to store at least one software module, a processor configured to execute the at least one software module stored in the memory, and a display unit configured to display a screen under control of the processor, wherein the software module includes an instruction set configured to control displaying a first summary guide corresponding to an outdoor environment i it is determined that the electronic device is positioned in the outdoor environment, and control displaying a second summary guide corresponding to an indoor environment if it is determined that the electronic device is positioned in the indoor environment. The first summary guide and the second summary guide are graphic User Interfaces (UI) for informing a spherical panorama shooting progress, and the second summary guide has a number of image shootings required for generating a spherical panoramic image, different from the number of image shootings in a case where the first summary guide is displayed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, and 3C are views illustrating a screen configuration that changes depending on a shooting progress in an electronic device according to an embodiment of the present disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a technology for shooting a spherical panoramic image in an electronic device is described.

In the present disclosure, the electronic device may be a portable electronic device, and may be one of a smartphone, a portable terminal, a mobile phone, a mobile pad, a media player, a tablet computer, a handheld computer, or a Personal Digital Assistant (PDA). Also, the electronic device may be a device combining two or more functions among the above devices.

Figure 1:
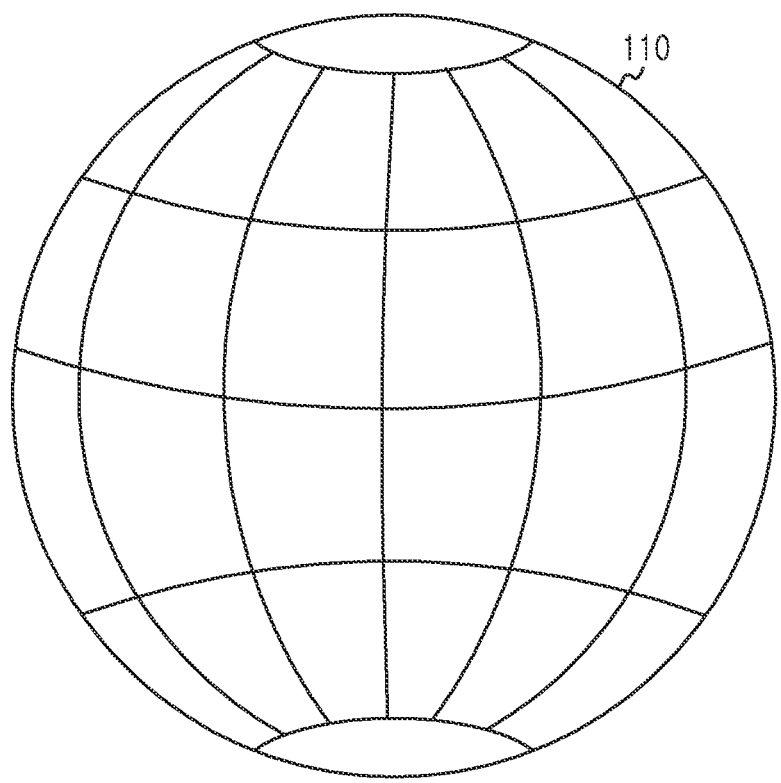
FIG. 1 is a view illustrating a User Interface (UI) representing a shot portion in an electronic device according to an embodiment of the present disclosure.

FIG. 1 is a view illustrating a User Interface (UI) representing a shot portion in an electronic device according to an embodiment of the present disclosure.

Referring to FIG. 1, the UI 110 has a spherical shape, and the surface of the sphere may be divided into a plurality of regions. The plurality of regions divided in the UI 110 may represent positions on which images shot during a spherical panorama shooting are disposed. The UI 110 moves in time for a preview point as the electronic device moves to left and right, and may move in the same manner with respect to up/down movement and rotation. The UI 110 may be displayed during spherical panorama shooting, and may be removed on a screen when the spherical panorama shooting ends.

Though not shown in FIG. 1, the UI 110 may be expressed such that a region where a currently previewed image, that is, an image to be shot is to be disposed may be discriminated from the rest of the regions. For example, the region where an image to be shot is to be disposed may be expressed using color, symbol, etc. different from other regions. Also, a region where a shooting-completed image has been disposed may be expressed such that region may be identified among non-shot regions.

Referring to FIG. 1, the number of regions included in each row on the sphere forming the UI 110 is the same, and may be sorted such that the boundaries of respective regions coincide. However, according to another embodiment of the present disclosure, the number of regions included in each row may not be the same. Also, according to another embodiment, each region and a shape may be also different. Also, the boundaries of the regions included in each row may not be sorted.

Hereinafter, for convenience in description, the present disclosure denotes the 'spherical graphic UI 110 representing disposition of a shot image, a shooting-completed region, and a currently previewed region, etc.' by a 'summary guide'.

FIGS. 2A, 2B, 2C, and 2D are views illustrating a summary guide that changes depending on a shooting progress in an electronic device according to an embodiment of the present disclosure.

Figure 2A:
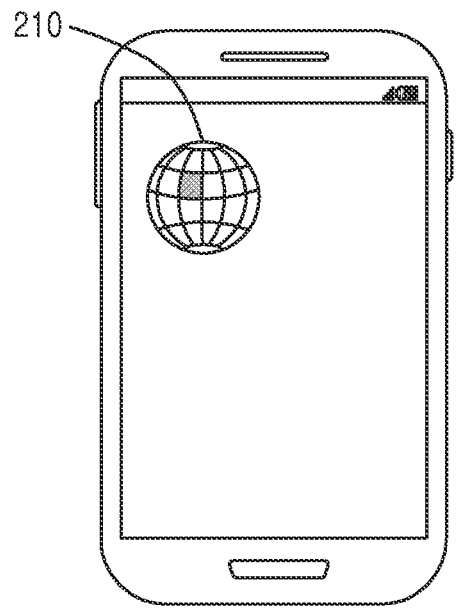
FIGS. 2A, 2B, 2C, and 2D are views illustrating a change of a summary guide according to a shooting progress in an electronic device according to an embodiment of the present disclosure.
Figure 2B:
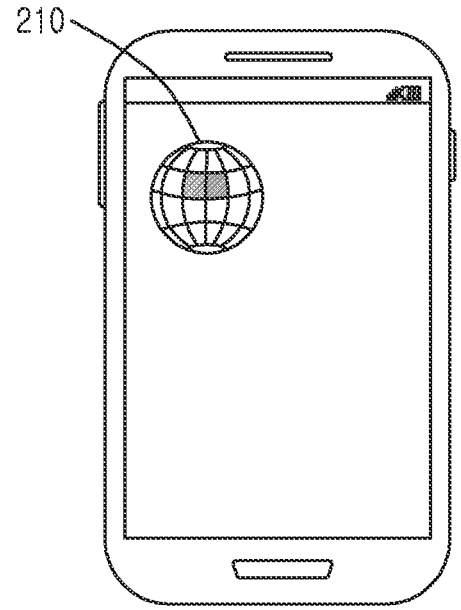
Figure 2C:
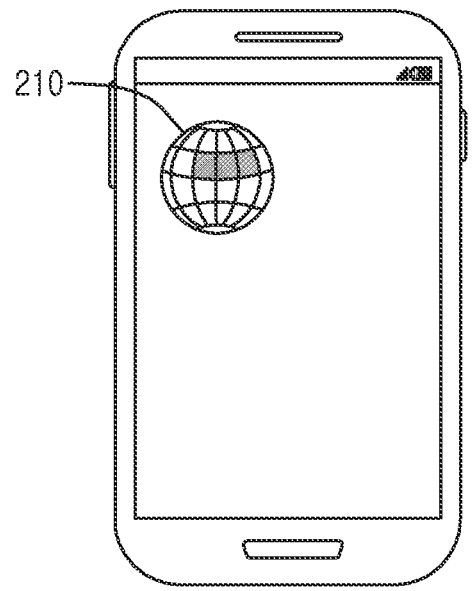
Figure 2D:
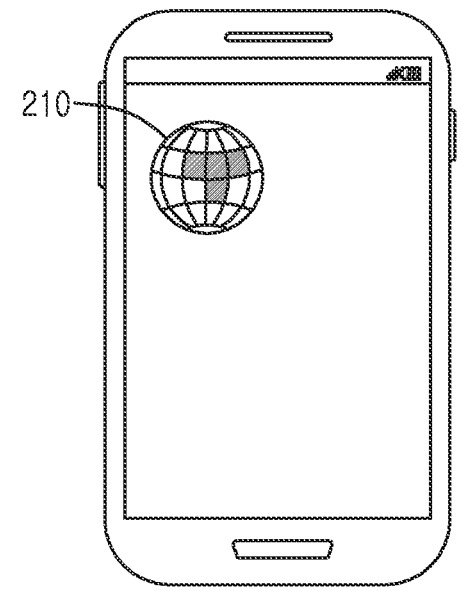

Referring to FIGS. 2A to 2D, the summary guide 210 may be disposed on the left upper portion of the screen. According to another embodiment of the present disclosure, the summary guide 210 may be disposed at a different position. Referring to FIG. 2A, the summary guide 210 is expressed such that one region inside the summary guide 210 may be discriminated from other regions, which may represent an image corresponding to the relevant region has been shot. As image shooting is performed gradually, the summary guide may be expressed such that shot regions may be discriminated as in FIGS. 2B, 2C, 2D.

In case of FIGS. 2A to 2D, regions may be discriminated using a shade mark. However, according to another embodiment of the present disclosure, regions to discriminate may be expressed via at least one of color, a symbol, flickering, etc. Though identification of a region is expressed using various patterns of shades in the illustrated drawing, this is an example for convenience in description. Therefore, expression for discriminating a region described below may be not only the shade but also color, a symbol, flickering, etc.

FIGS. 3A, 3B and 3C are views illustrating a screen configuration that changes depending on a shooting progress in an electronic device according to an embodiment of the present disclosure. These views illustrate an example of screen configuration of the electronic device during spherical panorama shooting.

Referring to FIG. 3A, the electronic device may display a summary guide 310 on a portion of the screen, and display a preview window 320 of an image being input via a sensor currently on the center of the screen. The preview window 320 may display a first image 322. At this point, the electronic device may display a region where the first image 322 currently previewed on the summary guide 310 is to be disposed such that the region may be discriminated. Under a state of FIG. 3A, the first image 322 expressed on a preview window 320 may be stored according to a user's manipulation.

FIG. 3B illustrates a situation where the first image 322 is stored under the state of FIG. 3A and then the electronic device rotates to the right. As the electronic device rotates to the right, the first image 322 may be displayed on the left side of the preview window 320, and a second image 324 may be displayed on the preview window 320. At this point, the electronic device may display a region corresponding to the first image 322 shot in advance on the summary guide 310 such that the region may be discriminated from other regions. Also, the electronic device may display a region where the second image 324 being previewed currently is to be disposed such that second image 324 may be discriminated. Under the state of FIG. 3B, the second image 324 expressed on the preview window 320 may be stored according to the user's manipulation.

FIG. 3C illustrates a situation where the second image 324 is stored under the state of FIG. 3B and then the electronic device rotates to the bottom. As the electronic device rotates to the lower end, the first image 322 and the second image 324 may be displayed above the preview window 320, and a third image 326 may be displayed on the preview window 320. At this point, the electronic device may display the region corresponding to the first image 322 and the region corresponding to the second image 324 shot in advance on the summary guide 310 such that they may be discriminated from other regions. Also, the electronic device may display a region where the third image 326 being previewed currently is to be disposed such that the third image 326 may be discriminated. Under the state of FIG. 3C, the third image 326 expressed on the preview window 320 may be stored according to the user's manipulation.

In case of the embodiment illustrated in FIGS. 3A to 3C, only region division of the summary guide 310 changes and a direction in which the summary guide 310 is shown may not change. However, according to another embodiment, as the electronic device rotates, the summary guide 310 may rotate together. For example, the summary guide 310 may rotate such that a region on which an image displayed on the preview window 320 is to be disposed in the summary guide 310 may be always displayed on the center. In this case, the summary guide 310 may rotate in a direction opposite to the rotation direction of the electronic device.

In case of the embodiment illustrated in FIGS. 3A to 3C, an observation point for the summary guide 310 may be defined as the inside of the sphere. Accordingly, a progression direction of shooting-completed regions inside the summary guide 310 may be the same as the progression direction of the preview window 320. However, according to another embodiment of the present disclosure, an observation point for the summary guide 310 may be defined as the outside of the sphere. In this case, a progression direction of shooting-completed regions inside the summary guide 310 may be different from the progression direction of the preview window 320. That is, since an observation point for the preview window 320 is the inside of the sphere generally, a progression direction of things observed in the outside may be opposite to the progression direction of a shooting-completed region. For example, in the case where the right region of a shooting-completed region with respect to the preview window 320 is previewed, the left region of the shooting-completed region on the sphere of the summary guide 310 may be previewed.

Spherical panorama shooting may generate one result by combining a plurality of images. Therefore, to secure a result with excellent image quality, it is advantageous that a large number of shootings exist when an object is located at a short distance. Generally, in case of an indoor environment, an object may exist at a relatively short distance, and in case of an outdoor environment, an object may exist at a relatively long distance. Therefore, in case of the indoor space where lots of short distance objects exist compared to the outdoor space where lots of long distance objects exist, a relatively greater number of shootings may be required. Furthermore, a greater number of image overlap regions for combination of images may be required.

Therefore, the electronic device according to an embodiment of the present disclosure may discriminate an indoor space and an outdoor space to require a different number of shootings. That is, in case of an indoor space, the electronic device may require a greater number of shootings than that of an outdoor space. Accordingly, the above-described summary guide may have different shapes for an indoor space and an outdoor space, respectively. For example, the summary guide may be configured as in FIGS. 4A and 4B below.

Figure 4A:
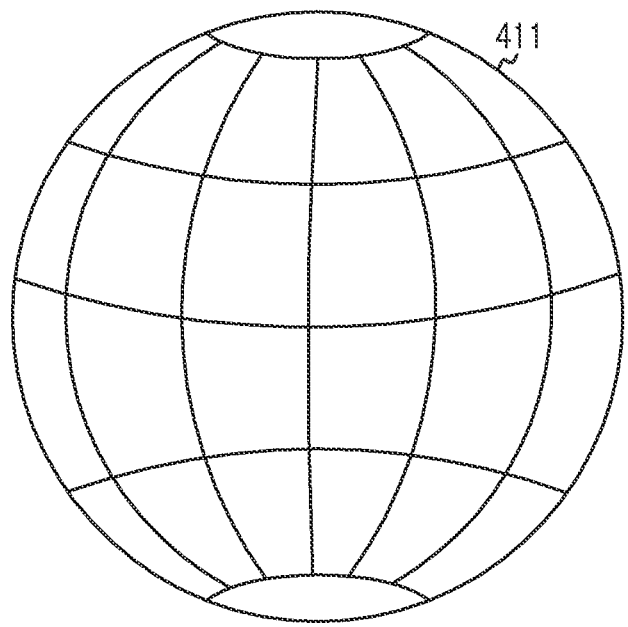
FIGS. 4A and 4B are views illustrating a summary guide that changes depending on an environment in an electronic device according to an embodiment of the present disclosure.
Figure 4B:
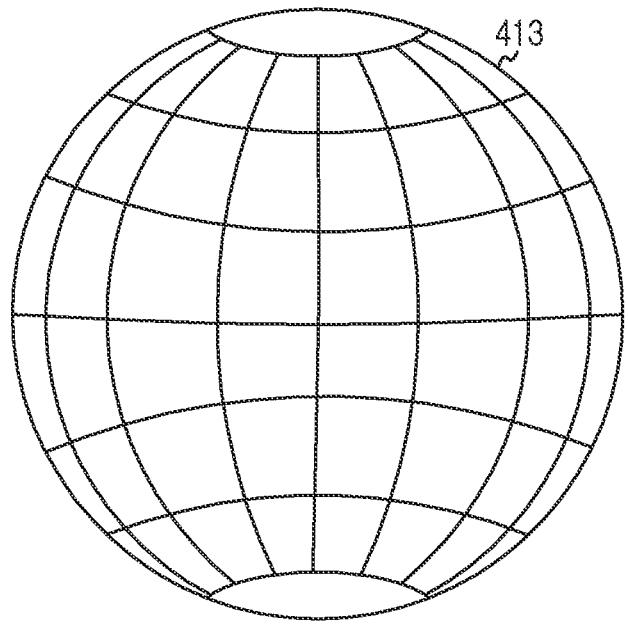

FIGS. 4A and 4B are views illustrating a summary guide that changes depending on an environment in an electronic device according to an embodiment of the present disclosure. FIG. 4A illustrates a summary guide 411 provided under an outdoor environment, and FIG. 4B illustrates a summary guide 413 provided under an indoor environment.

Referring to FIGS. 4A and 4B, the summary guide 413 is provided in the indoor environment may include a greater number of regions than the summary guide 411 provided in the outdoor environment. That is, the summary guides 411 and 413 may express a required number of shootings. Accordingly, a user may know a greater number of shootings is required for the indoor environment.

According to another embodiment of the present disclosure, as illustrated in FIGS. 4A and 4B, a summary guide provided in the outdoor environment may include a greater number of regions. That is, the number of shootings under the outdoor environment may be relatively greater than the number of shootings under the indoor environment. That is, various embodiments of the present disclosure include cases where the number of shootings under the outdoor environment and the number of shootings under the indoor environment are different from each other.

Figure 5A:
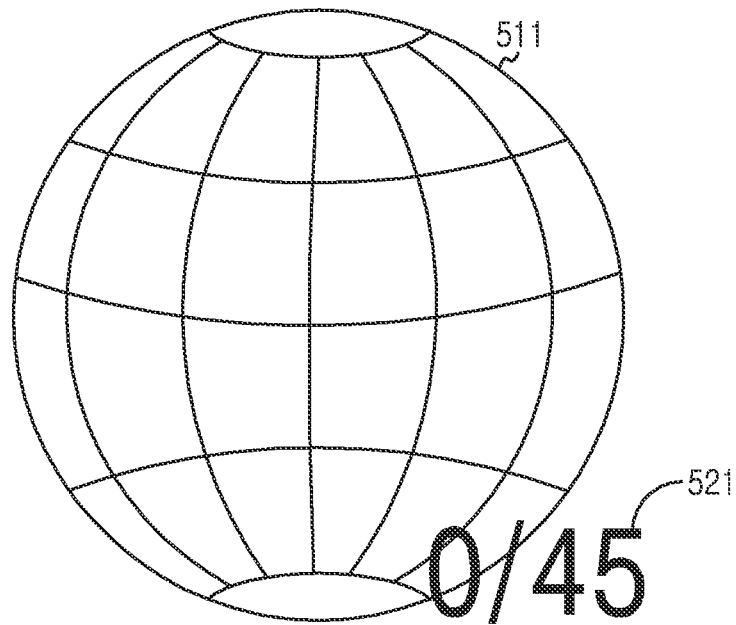
FIGS. 5A and 5B are views illustrating a summary guide that changes depending on an environment in an electronic device according to another embodiment of the present disclosure.
Figure 5B:
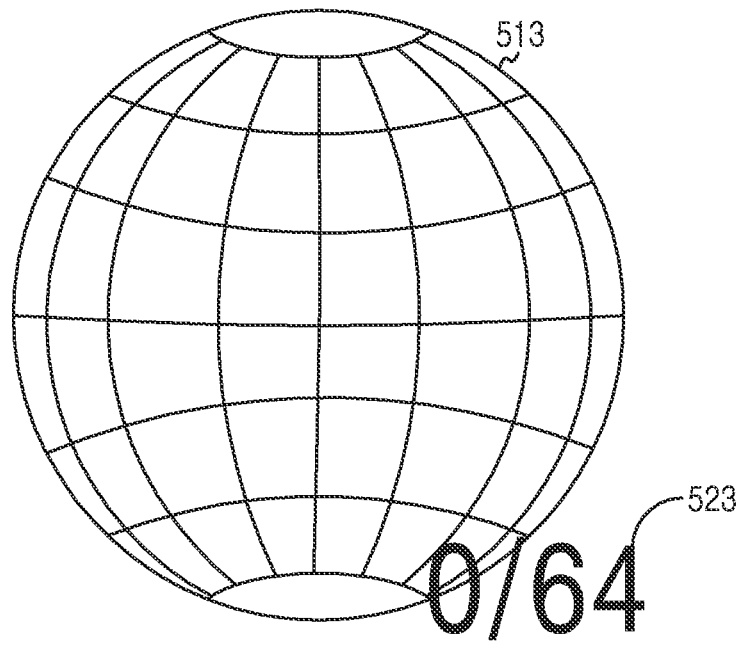

FIGS. 5A and 5B are views illustrating a summary guide that changes depending on an environment in an electronic device according to another embodiment of the present disclosure.

Referring to FIGS. 5A and 5B, a summary guide 511 is provided in an outdoor environment, and a summary guide 513 provided in an indoor environment. Unlike the embodiment illustrated in FIGS. 4A and 4B, the summary guides 521 and 523 illustrated in FIGS. 5A and 5B may further require symbols 521 and 523 representing a total number of shootings and the number of completed shootings. In case of FIGS. 5A and 5B, the summary guide 511 provided in the outdoor environment is exemplified as 45 times, and the summary guide 513 provided in the indoor environment is exemplified as 64 times. However, according to another embodiment of the present disclosure, the number of shootings under the indoor environment and the outdoor environment may change. In case of the embodiment illustrated in FIGS. 5A and 5B, frequency symbols 521 and 523 express a total number of shootings and the number of completed shootings, but according to another embodiment, only one of a total number of shootings and the number of completed shootings may be expressed.

As described above, a different summary guide may be provided depending on an indoor space and an outdoor space. In addition, according to an embodiment of the present disclosure, a separate environment notice icon expressing an indoor space and an outdoor space may be further provided in addition to different summary guides. A user may more clearly determine whether the electronic device has determined a current environment is an indoor space or determined the current environment is an outdoor space via the environment notice icon.

Furthermore, according to another embodiment of the present disclosure, the environment notice icon may function as an input means, that is, a button for switching between an indoor mode and an outdoor mode in addition to expressing only a determination result of an indoor space and an outdoor space. In this case, even when an error occurs in determination of an indoor space and an outdoor space by the electronic device, a user may correct the error in person via the environment notice icon. Also, in the case where the electronic device approaches an object though an environment is an outdoor space, or in the case where a user desires a spherical panoramic image of a more excellent image quality though the electronic device has not approached an object, the user may change the number of shootings using the environment notice icon.

Figure 6:
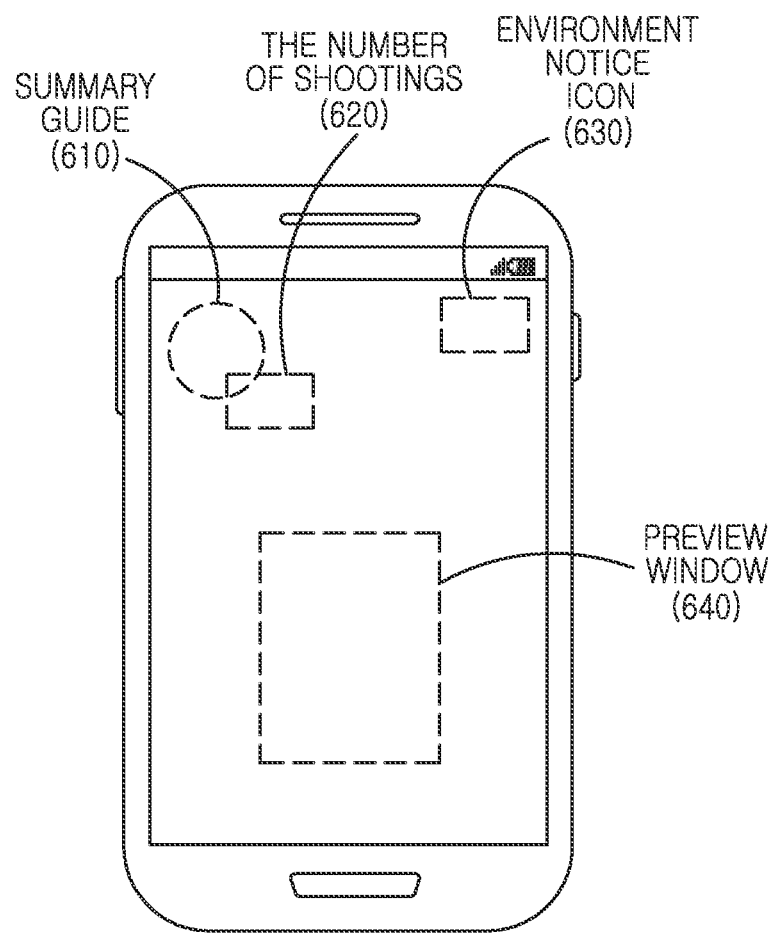
FIG. 6 is a view illustrating screen configuration in an electronic device according to an embodiment of the present disclosure.

In the case where the environment notice icon is provided together, the screen may be configured as in FIG. 6. FIG. 6 is a view illustrating screen configuration in an electronic device according to an embodiment of the present disclosure.

Referring to FIG. 6, a screen for spherical panorama shooting may include a summary guide 610, the number of shootings 620, an environment notice icon 630, and a preview window 640. According to another embodiment of the present disclosure, at least one of the number of shootings 620, the environment notice icon 630, and the preview window 640 may be omitted. Also, according to various embodiments of the present disclosure, the position of the summary guide 610, the number of shootings 620, the environment notice icon 630, and the preview window 640 may change.

As described above, an electronic device according to an embodiment of the present disclosure may discriminate an indoor space and an outdoor space to provide different guide guides. For this purpose, the electronic device should determine whether a surrounding environment is an indoor space and an outdoor space. For determination of the indoor space and the outdoor space, various techniques may be adopted. For example, the determination of the indoor space and the outdoor space may be performed via analysis of an image input via a sensor. Here, the analysis of the image may include analysis of at least one of illuminance, a boundary direction, and a color direction.

As a specific example, the determination of the indoor space and the outdoor space may be performed based on EOH and COH. A block diagram for the determination of the indoor space and the outdoor space based on EOH and COH is illustrated in FIG. 7.

Figure 7:
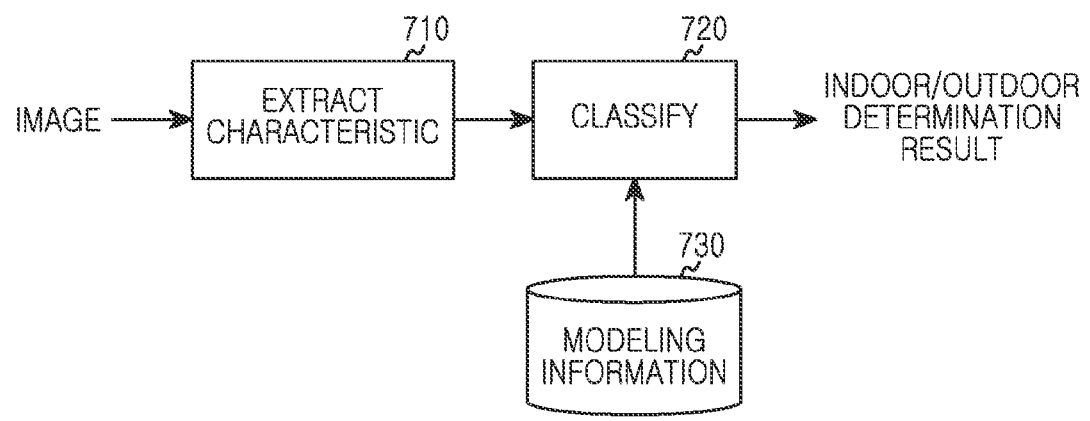
FIG. 7 is a functional block diagram for discriminating an indoor space and an outdoor space in an electronic device according to an embodiment of the present disclosure.

FIG. 7 is a functional block diagram for discriminating an indoor space and an outdoor space in an electronic device according to an embodiment of the present disclosure.

Referring to FIG. 7, a characteristic extract block 710 may receive an input image to extract a characteristic of the image. That is, the characteristic extract block 710 may analyze Edge Orientation Histogram (EOH) and Color Orientation Histogram (COH). An example of an analysis result of EOH and COH is illustrated in FIG. 8.

Figure 8:
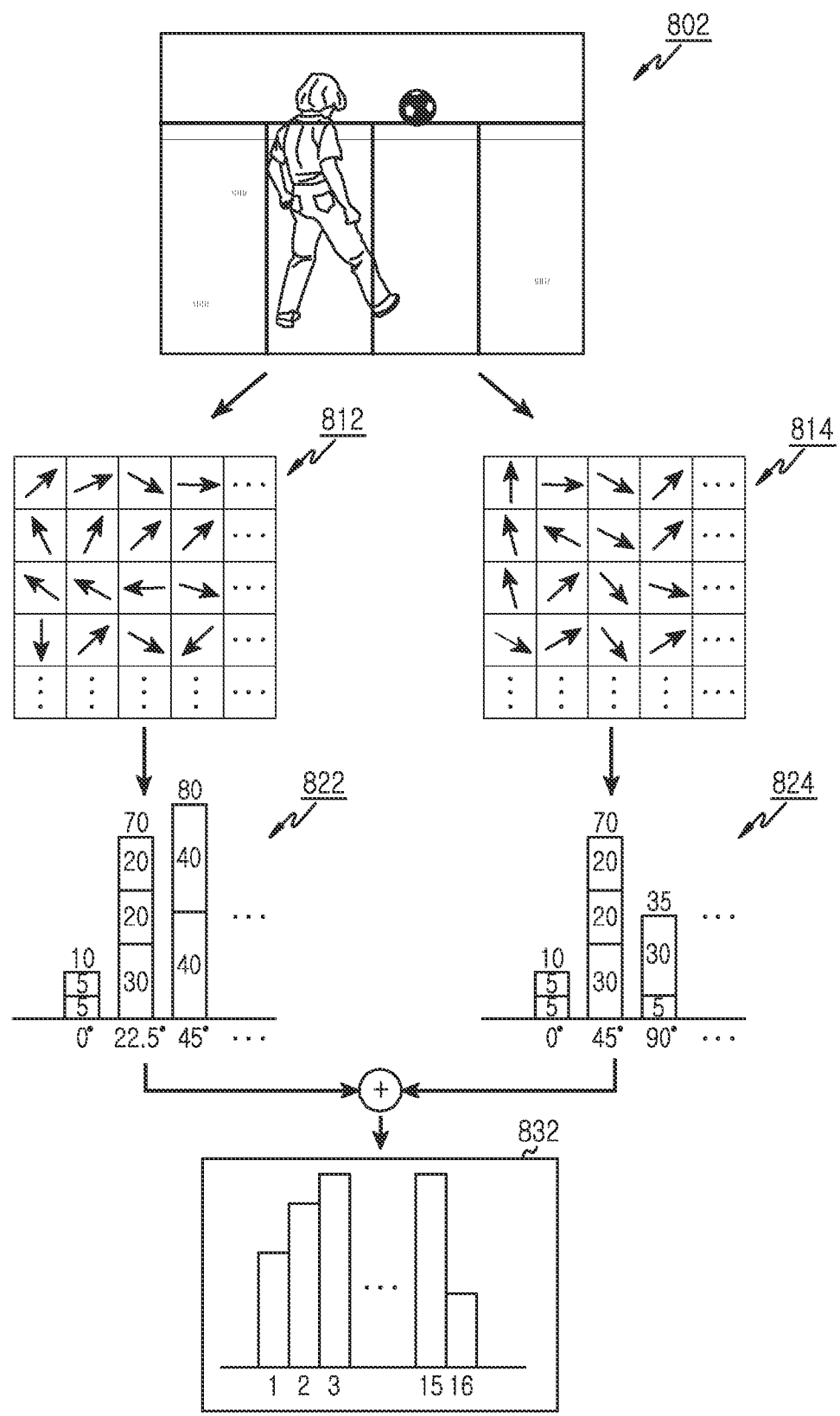
FIG. 8 is a view illustrating an example of an image analysis result for discriminating an indoor space and an outdoor space in an electronic device according to an embodiment of the present disclosure.

FIG. 8 is a view illustrating an example of an image analysis result for discriminating an indoor space and an outdoor space in an electronic device according to an embodiment of the present disclosure.

Referring to FIG. 8, an input image 802 is divided into five regions, and EOH 812 and COH 814 for each region may be generated. In EOH 812, an arrow direction represents the direction of a boundary, and the length of an arrow represents the magnitude of a frequency corresponding to a boundary. In COH 814, an arrow direction represents the direction of hue, and the length of an arrow represents saturation. After that, EOH 812 and COH 814 are processed statistically and expressed in the form of graphs 822 and 824 with respect to a direction angle, and the graphs 822 and 824 combine, so that ECOH 832 may be generated.

A classify block 720 may determine whether an environment is an indoor space or an outdoor space based on ECOH 832 generated by the characteristic extract block 710. The classify block 720 may use modeling information 730 defined in advance. The modeling information includes ECOHs regarding images of various indoor environments and outdoor environments. Therefore, the classify block 720 may retrieve ECOH regarding a currently input image, that is, ECOH most contiguous to ECOH 832 provided from the characteristic extract block 710 from the modeling information. For example, the classify block 720 may retrieve the most contiguous ECOH according to a random forest technique. When the most contiguous ECOH is retrieved, the classify block 720 may determine whether the retrieved ECOH corresponds to an outdoor environment or an indoor environment. When the retrieved ECOH corresponds to an outdoor environment as a result of determination, the classify block 720 may determine the surrounding environment is an outdoor environment. In contrast, when the retrieved ECOH corresponds to an indoor environment, the classify block 720 may determine the surrounding environment is an indoor environment.

Figure 9:
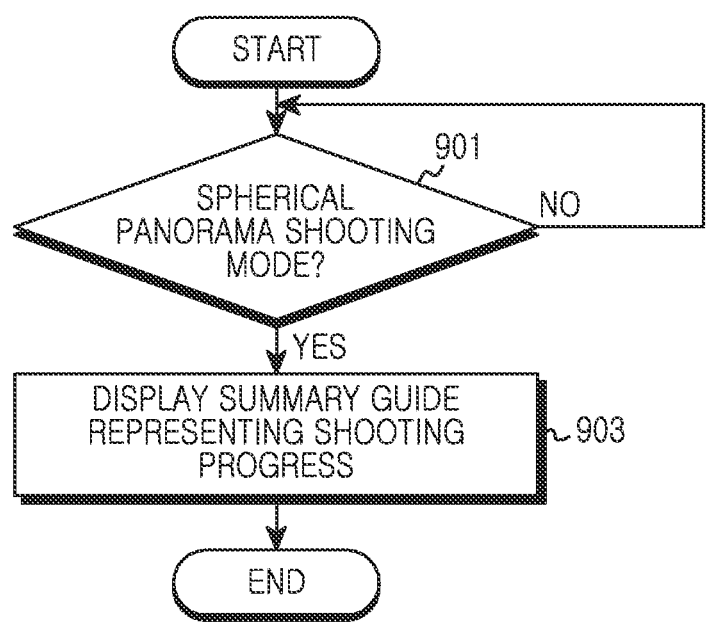
FIG. 9 is a flowchart illustrating an operation procedure of an electronic device according to an embodiment of the present disclosure.

FIG. 9 is a flowchart illustrating an operation procedure of an electronic device according to an embodiment of the present disclosure.

Referring to FIG. 9, the electronic device may determine whether to enter a spherical panorama shooting mode in operation 901. The spherical panorama shooting mode may be entered depending on a user's instruction via an input means provided to the electronic device. For example, the input means may be a touchscreen, a button, a remote radio frequency signal, a microphone, etc. When it is determined not to enter the spherical panorama shooting mode (i.e., NO at operation 901), the process goes back to operation 901. When it is determined to enter the spherical panorama shooting mode (i.e., YES at operation 901), the process proceeds to operation 903.

When entering the spherical panorama shooting mode, the electronic device may proceed to operation 903 to display a summary guide representing a shooting progress. The summary guide is a graphic UI representing a spherical panorama shooting progress. The summary guide has a spherical shape divided into a plurality of regions, and regions on the sphere represent positions on which respective images are to be disposed. According to another embodiment of the present disclosure, the electronic device may further display at least one of the number of shootings representing at least one of a total number of shootings and the number of completed shootings for generating a spherical panoramic image, an environment notice icon representing whether a surrounding environment is an indoor space or an outdoor space, and a preview window for displaying an image input via a sensor.

The method described above in relation with FIG. 9 under of the present invention may be provided as one or more instructions in one or more software modules, or computer programs stored in an electronic device including a portable terminal.

Figure 10:
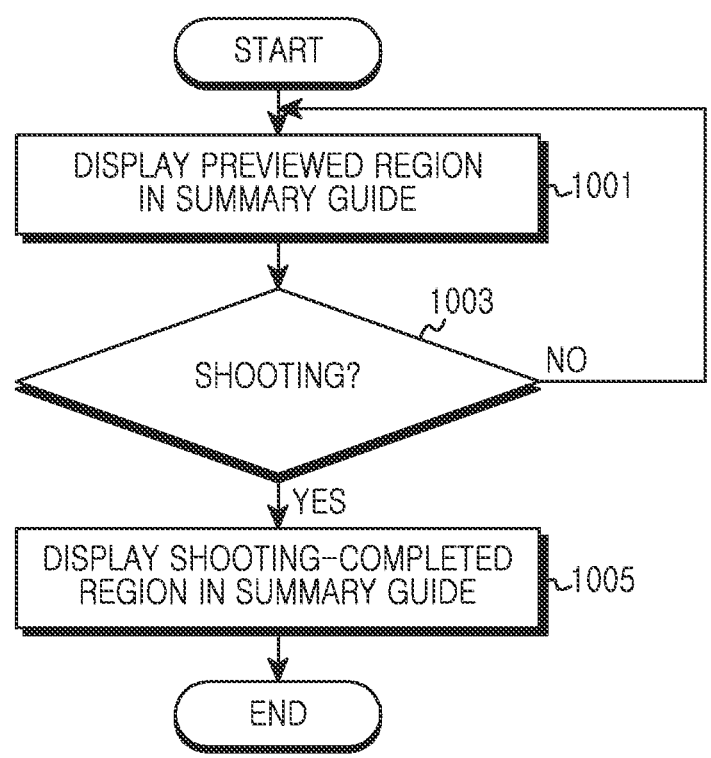
FIG. 10 is a flowchart illustrating an operation procedure of an electronic device according to another embodiment of the present disclosure.

FIG. 10 is a flowchart illustrating an operation procedure of an electronic device according to another embodiment of the present disclosure.

Referring to FIG. 10, the electronic device may display a region on which an image being previewed is to be disposed in a summary guide such that the region may be discriminated from other regions in operation 1001. For example, the electronic device may display the region on which the image being previewed is to be disposed such that the region may be identified among other regions using at least one of a different shade, a different color, and a different symbol.

After that, the electronic device may proceed to operation 1003 to determine whether an image is shot. The image may be shot via a user's shooting instruction. When it is determined that the image is not shot(i.e., NO at operation 1003), the process goes back to operation 1001. When it is determined that the image is shot (I.E., YES at operation 1003), the process proceeds to operation 1005.

When the image is shot, the electronic device may proceed to operation 1005 to display at least one region on which the shooting-completed image has been disposed in the summary guide such that the region may be discriminated from other regions. For example, the electronic device may display the at least one region on which the shooting-completed image has been disposed such that the region may be identified among the other regions using at least one of a different shade, a different color, and a different symbol.

Though not shown in FIG. 10, the electronic device may change a direction in which the summary guide is shown depending on movement of the electronic device. In other words, in the case where a user moves the electronic device to left and right, up and down, or rotates the electronic device, the electronic device may change a direction in which the summary guide is shown to a corresponding direction. Specifically, the electronic device may rotate the summary guide such that a region on which an image being previewed is to be disposed in the summary guide may be always displayed on the center.

The method described above in relation with FIG. 10 under of the present invention may be provided as one or more instructions in one or more software modules, or computer programs stored in an electronic device including a portable terminal.

Figure 11:
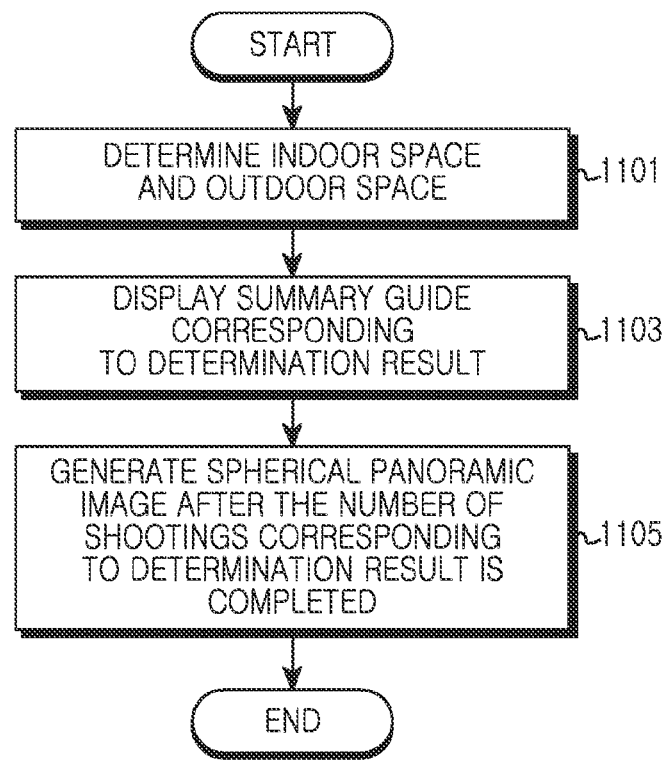
FIG. 11 is a flowchart illustrating an operation procedure of an electronic device according to still another embodiment of the present disclosure.

FIG. 11 is a flowchart illustrating an operation procedure of an electronic device according to still another embodiment of the present disclosure.

Referring to FIG. 11, the electronic device may determine whether a surrounding environment is an indoor space or an outdoor space in operation 1101. According to an embodiment of the present disclosure, the electronic device may determine whether a surrounding environment is an indoor space or an outdoor space based on an analysis result for at least one of illuminance, a boundary direction, and a color direction of an image. According to another embodiment of the present disclosure, the electronic device may determine whether a surrounding environment is an indoor space or an outdoor space based on a user's selection. For example, the electronic device may determine whether a surrounding environment is an indoor space or an outdoor space during a sensor correction operation of a spherical panorama shooting initial stage. The sensor may include a gyro sensor, an acceleration sensor, etc.

After determining the indoor space or the outdoor space, the electronic device may proceed to operation 1103 to display a summary guide corresponding to a determination result of the indoor space or the outdoor space. That is, the electronic device may selectively provide a first summary guide corresponding to the indoor environment and a second summary guide corresponding to the outdoor environment.

After that, the electronic device may proceed to operation 1105 to generate a spherical panoramic image after the number of shootings corresponding to the determination result of the indoor space or the outdoor space are completed. That is, the electronic device may induce the number of image shootings corresponding to the determination result via the summary guide. Accordingly, when a required number of image shootings are completed by a user's manipulation, the electronic device may generate the spherical panoramic image by combining the shot images. For example, the electronic device may detect a boundary of an object from the images, and connect respective images on the sphere with reference to portions whose boundaries coincide. In addition, the electronic device may correct the images based on a sensing result. For example, the sensing result may include a rotation direction and degree, and a movement direction and degree during shooting.

After that, though not shown in FIG. 11, the electronic device may display the generated spherical panoramic image. For example, the spherical panoramic image may be displayed in the form of a plane or a sphere.

The method described above in relation with FIG. 11 under of the present invention may be provided as one or more instructions in one or more software modules, or computer programs stored in an electronic device including a portable terminal.

Figure 12:
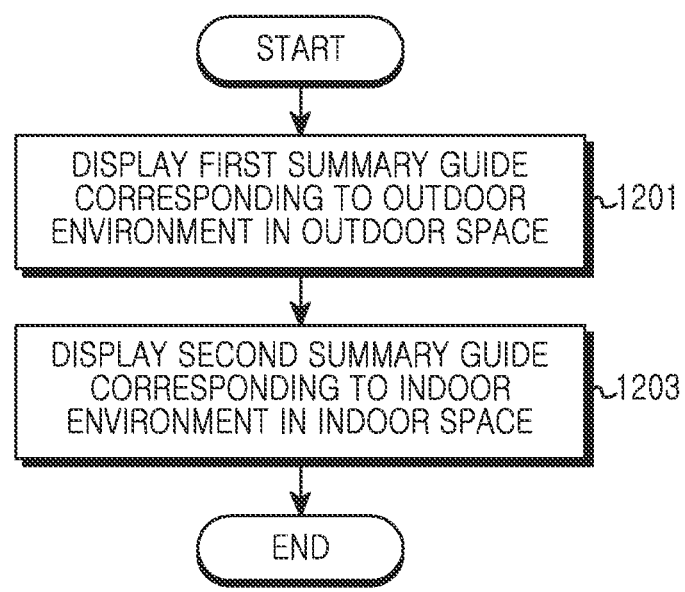
FIG. 12 is a flowchart illustrating an operation procedure of an electronic device according to further another embodiment of the present disclosure.

FIG. 12 is a flowchart illustrating an operation procedure of an electronic device according to further another embodiment of the present disclosure.

Referring to FIG. 12, in the case where the electronic device is disposed in an outdoor environment, the electronic device may display a first summary guide corresponding to the outdoor environment in operation 1201. The first summary guide may express the number of shootings corresponding to the outdoor environment. For example, the first summary guide may express the number of shootings via the number of divided regions on the sphere.

In the case where the electronic device is disposed in an indoor environment, the electronic device proceeds to operation 1203 to display a second summary guide corresponding to the indoor environment. The second summary guide may express the number of shootings corresponding to the indoor environment. At this point, the number of shootings corresponding to the indoor environment expressed by the second summary guide is greater than the number of shootings corresponding to the outdoor environment expressed by the first summary guide. For example, the second summary guide may express the number of shootings via the number of divided regions on the sphere.

Though not shown in FIG. 12, the electronic device may explicitly display the number of shootings in addition to the first summary guide and the second summary guide. At this point, the number of shootings may include at least one of a total number of shootings and the number of completed shootings.

According to another embodiment of the present disclosure, unlike the illustration in FIGS. 4A and 4B, a summary guide provided under the outdoor environment may include a greater number of regions. That is, the number of shootings under the outdoor environment may be relatively greater than the number of shootings under the indoor environment. That is, various embodiments of the present disclosure include cases where the number of shootings under the outdoor environment and the number of shootings under the indoor environment are different from each other.

The method described above in relation with FIG. 12 under of the present invention may be provided as one or more instructions in one or more software modules, or computer programs stored in an electronic device including a portable terminal.

The present invention may be implemented in an electronic device including a portable terminal such as, for example, a smart phone and a mobile telecommunication terminal. Hereunder, a portable terminal is used as an example for the electronic device FIG. 13 is a block diagram illustrating an electronic device according to an embodiment of the present disclosure.

Figure 13:
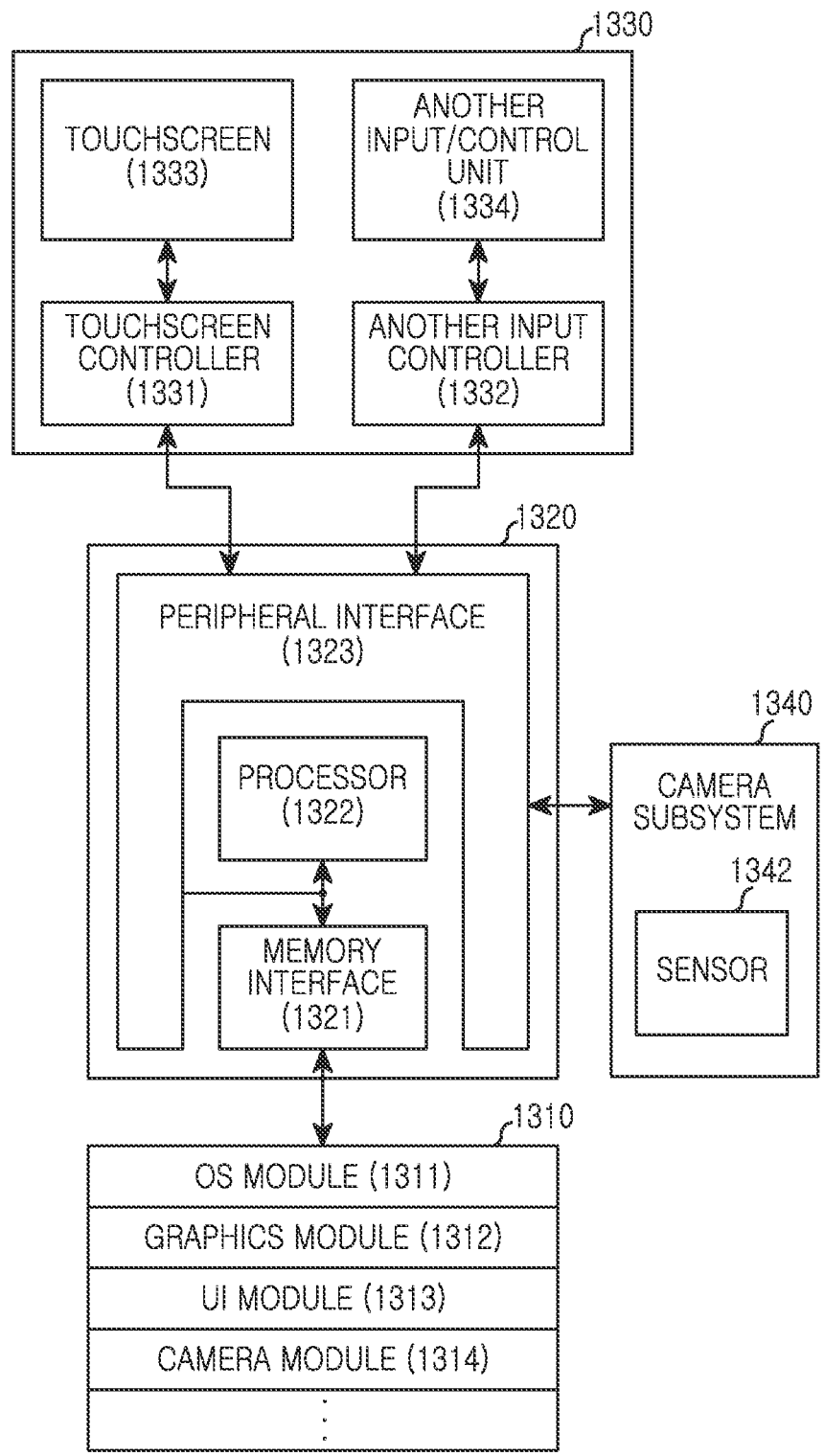
FIG. 13 is a block diagram illustrating an electronic device according to an embodiment of the present disclosure.

Referring to FIG. 13, the electronic device may include a memory 1310, a processor unit 1320, an Input/Output (I/O) subsystem 1330, and a camera subsystem 1340. A plurality of memories 1310 may be provided.

The memory 1310 may store at least one software, a micro code, setting information, etc. The memory 1310 may include at least one of at least one high speed random access memory, a non-volatile memory, at least one optical storage, and a flash memory (ex: NAND, NOR). A software element stored in the memory 1310 may include an Operating System (OS) module 1311, a graphics module 1312, a UI module 1313, a camera module 1314, at least one application module (not illustrated), etc. Also, a module which is a software element may be expressed as a set of instructions, and the module may be denoted by an 'instruction set' or a 'program'.

The OS module 1311 may include an instruction set for controlling a general system operation. For example, the OS module 1311 may be WINDOWS™, LINUX™, DARWIN™, real-time executive in C (RTXC™), UNIX™, OS X™, and a built-in OS such as VXWORKS™, ANDROID™, and iOS™. For example, the OS module 1311 may take charge of a general system operation control such as memory management and control, storage hardware control and management, power control and management, etc. The OS module 1311 may control to perform swift communication between at least one hardware element and at least one software element.

The graphics module 1312 may include at least one instruction set for providing/displaying graphics to/on the touchscreen 1333. Here, the graphics may include text, a web page, an icon, a digital image, a video, an animation, etc. Since the touchscreen 1333 displays an image, the touchscreen 1333 may be denoted by a 'display unit'.

The UI module 1313 may include at least one instruction set for providing a UI. For example, the UI module 1313 may control how the state of the UI changes, or under what condition the state of the UI changes, etc.

The camera module 1314 may include at least one instruction set for performing camera-related processes and functions.

The memory 1310 may include an additional module besides the above-described modules 1311 to 1314. Alternatively, according to another embodiment, a portion of the above-described modules 1311 to 1314 may be excluded.

The processor unit 1320 may include a memory interface 1321, a processor 1322, and a peripheral interface 1323. Depending on cases, the entire processor unit 1320 may be denoted by a 'processor'. The memory interface 1321, the processor 1322, and the peripheral interface 1323 may be separate elements, or may be included in at least one integrated circuit.

The processor 1322 may include at least one hardware chip. The processor 1322 may allow the electronic device to perform a function implemented by the software module by executing the software module. Particularly, the processor 1322 may perform an embodiment of the present disclosure in cooperation with software modules stored in the memory 1310. Also, the processor 1322 may include at least one data processor, and at least one image processor. According to another embodiment, the data processor and the image processor may be configured as separate hardwares. Also, the processor 1322 may be formed of a plurality of processors performing different functions, respectively. The processor 1322 may be denoted by an application processor (AP).

The memory interface 1321 may provide a transfer path of data and a control signal between the memory 1310 and the processor 1322. For example, the memory interface 1321 may provide an interface for accessing the memory 1310. The peripheral interface 1323 connects the I/O subsystem 1330 and at least one peripheral of the electronic device to the processor 1321 and the memory 1310.

The I/O subsystem 1330 may include a touchscreen controller 1331, another input controller 1332, a touchscreen 1333, and another input/control unit 1334.

The touchscreen controller 1331 may be coupled to the touchscreen 1333. Though not limited thereto, the touchscreen 1333 and the touchscreen controller 1331 may detect a contact, movement, and stoppage of the contact or the movement using not only capacitive, resistive, infrared, and surface acoustic wave technologies for determining at least one contact point on the touchscreen 1333 but also a detection technology including other proximity sensor arrangements or other elements.

Another input controller 1332 may be coupled to another input/control unit 1334. Another input/control unit 1334 may include an up/down button for at least one volume control. Also, the button may have a shape such as a push button or a locker button, a locker switch, a thumb-wheel, a dial, a stick, a pointer device such as a stylus, etc.

The touchscreen 1333 may provide an input/output interface between the electronic device and a user. For example, the touchscreen 1333 may transfer the user's touch input to the electronic device. Also, the touchscreen 1333 is a medium for showing an output from the electronic device to the user. For example, the touchscreen 1333 shows a visual output to the user. The visual output may be expressed in the form of text, graphics, a video, and a combination of these. Various display means may be used as the touchscreen 1333. For example, though not limited thereto, the touchscreen 1333 may include at least one of an LCD, an LED, an LPD, an OLED, an AMOLED, and an FLED.

The camera subsystem 1340 may perform functions of photo shooting, moving picture shooting, etc. The camera subsystem 1340 may include an image sensor 1342, a lens, etc. As the image sensor 1342, at least one of a CCD and a CMOS may be used. For example, the camera subsystem 1340 may recognize light input via a lens using the image sensor 1342, and convert an image recognized by the image sensor to data.

According to an embodiment of the present disclosure, the processor unit 1322 may display a summary guide during spherical panoramic image shooting via the touchscreen 1333. At this point, the processor 1322 may determine whether a surrounding environment is an indoor space or an outdoor space during spherical panoramic image shooting, and provide a summary guide corresponding to the determination result. Also, the processor 1322 may determine whether a surrounding environment is an indoor space or an outdoor space during spherical panoramic image shooting, require the number of shootings corresponding to the determination result, and generate the spherical panoramic image after a required number of shootings are completed. For this purpose, the processor 1322 may include a hardware block for performing the surrounding environment determination, the summary guide display, and the shooting. According to another embodiment, the memory 1310 may store a software module for performing the surrounding environment determination, the summary guide display, and the shooting, and the processor 1322 may execute the software module. That is, the processor 1322 may perform the procedures of FIGS. 9 to 12. According to another embodiment, a separate hardware block for performing the surrounding environment determination, the summary guide display, and the shooting may be provided. According to still another embodiment, the function for performing the surrounding environment determination, the summary guide display, and the shooting may be distributed to and implemented by the processor 1322 and a separate processor.

According to an embodiment of the present disclosure, when entering a spherical panorama shooting mode, the processor 1322 may display a summary guide representing a shooting progress. The summary guide means a spherical graphic UI representing disposition of an image being shot, a shooting-completed region, a currently previewed region, etc. According to another embodiment of the present disclosure, the processor 1322 may further display at least one of the number of shootings representing at least one of a total number of shootings and the number of completed shootings for generating a spherical panoramic image, an environment notice icon representing whether a surrounding environment is an indoor space or an outdoor space, and a preview window for displaying an image input via a sensor.

According to another embodiment, the processor 1322 may display a region on which a previewed image is to be disposed in the summary guide such that the region may be discriminated from other regions. For example, the processor 1322 may display the region on which the previewed region is to be disposed such that the region may be identified among the other regions using at least one of a different shade, a different color, and a different symbol. After that, when an image is shot, the processor 1322 may display at least one region on which a shooting-completed image has been disposed in the summary guide such that the at least one region may be discriminated from other regions. For example, the processor 1322 may display at least one region on which a shooting-completed image has been disposed such that the at least one region may be identified among the other regions using at least one of a different shade, a different color, and a different symbol.

According to still another embodiment of the present disclosure, the processor 1322 may change a direction in which the summary guide is shown depending on movement of the electronic device. In other words, in the case where a user moves the electronic device to left and right, up and down, or rotates the electronic device, the processor 1322 may change a direction in which the summary guide is shown to a corresponding direction. The processor 1322 may rotate the summary guide such that a region on which an image being previewed is to be disposed in the summary guide may be always displayed on the center.

According to further another embodiment of the present disclosure, the processor 1322 may determine whether a surrounding environment is an indoor space or an outdoor space. For example, the processor 1322 may determine whether a surrounding environment is an indoor space or an outdoor space based on an analysis result regarding at least one of illuminance, a boundary direction, and a color direction of an image, or a user's selection. After that, the processor 1322 may display a summary guide corresponding to the determination result of the indoor space or the outdoor space. That is, the processor 1322 may display a first summary guide corresponding to an outdoor environment in the case where the electronic device is disposed in the outdoor environment, and may display a second summary guide corresponding to an indoor environment in the case where the electronic device is disposed in the indoor environment. After that, the processor 1322 may induce the number of image shootings corresponding to the determination result via the summary guide. When a required number of image shootings are completed, the electronic device may generate the spherical panoramic image by combining the shot images.

The electronic device may perform better image synthesis in a synthesis technique of successive images such as a spherical panoramic image, and improve a user's convenience. Specifically, an embodiment of the present disclosure may provide a function for allowing a user to easily recognize a shooting progress state in an operation of shooting a spherical panoramic image, and change the number of shootings of an indoor/outdoor space to improve accuracy of a synthesis via a greater number of shootings in an indoor space where an object is positioned in a close-range view frequently, and raise a user's convenience by selecting a relatively small number of shootings in an outdoor space where an object is positioned in a distant view frequently.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the specific embodiments of the present disclosure, the elements included in the present disclosure may be expressed as the singular or the plural depending on a proposed specific embodiment. However, though the expression of the singular or the plural has been selected suitable for a suggested circumstance for convenience in description, the present disclosure is not limited to the singular or the plural of elements, and even an element expressed as the plural may be configured as the singular and even an element expressed as the singular may be configured as the plural.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   displaying, when it is determined that the electronic device is positioned in an outdoor environment, a first summary guide corresponding to the outdoor environment; and
   displaying, when it is determined that the electronic device is positioned in an indoor environment, a second summary guide corresponding to the indoor environment,
   wherein the first summary guide and the second summary guide comprise graphic user interfaces (UIs) for informing a spherical panorama shooting progress,
   wherein the first number of image shootings is different from the second number of image shootings,
   wherein the displaying of the first summary guide comprises displaying a first number of image shootings that are required for generating a spherical panoramic image in the outdoor environment, and
   wherein the displaying of the second summary guide comprises displaying a second number of image shootings that are required for generating the spherical panoramic image in the indoor environment.

2. The method of claim 1, wherein the second summary guide has a greater number of shootings required for generating the spherical panoramic image than a case where the first summary guide is displayed.

3. The method of claim 1, wherein each of the first summary guide and the second summary guide comprise a spherical shape divided into a plurality of regions, and the regions represent a position on which each image is to be disposed.

4. The method of claim 1, further comprising:
   displaying a region on which a previewed image is to be disposed via one of the first summary guide and the second summary guide such that the region is discriminated from other regions.

5. The method of claim 1, further comprising:
   displaying a region on which at least one shooting-completed image is to be disposed via one of the first summary guide and the second summary guide such that the region is discriminated from other regions.

6. The method of claim 1, further comprising:
   changing a direction in which one of the first summary guide and the second summary guide is shown depending on at least one of left and right movement, up and down movement, and rotation of the electronic device.

7. The method of claim 1, further comprising:
   determining whether the electronic device is positioned in one of the outdoor environment and the indoor environment based on a user's selection.

8. The method of claim 1, further comprising:
   determining whether the electronic device is positioned in one of the outdoor environment and the indoor environment based on an analysis result of at least one of illuminance, a boundary direction, and a color direction of a previewed image.

9. The method of claim 8, wherein the analysis result comprises Edge Orientation Histogram (EOH) and Color Orientation Histogram (COH).

10. The method of claim 1, further comprising:
    generating, when it is determined that the electronic device is positioned in the outdoor environment, after a number of image shootings corresponding to the outdoor environment are completed, the spherical panoramic image by combining the shot images; and
    generating, when it is determined that the electronic device is positioned in the indoor environment, after a number of image shootings corresponding to the indoor environment are completed, the spherical panoramic image by combining the shot images, wherein the number of shootings corresponding to the indoor environment is greater than the number of shootings corresponding to the outdoor environment.

11. An electronic device comprising:
a display configured to display one of a first summary guide and a second summary guide; and
a processor configured to:
control the display to display the first summary guide corresponding to an outdoor environment, when it is determined that the electronic device is positioned in the outdoor environment, and
control the display to display the second summary guide corresponding to an indoor environment, when it is determined that the electronic device is positioned in the indoor environment,
wherein the first summary guide and the second summary guide comprise graphic user interfaces (UIs) for informing a spherical panorama shooting progress,
wherein the first number of image shootings is different from the second number of image shootings, and
wherein the processor is configured to control the display to display a required number of image shootings corresponding to one of the indoor environment and the outdoor environment.

12. The electronic device of claim 11, wherein the second summary guide comprises a greater number of shootings required for generating the spherical panoramic image than a case where the first summary guide is displayed.

13. The electronic device of claim 11, wherein each of the first summary guide and the second summary guide comprise a spherical shape divided into a plurality of regions, and the plurality of regions represent a position on which each image is to be disposed.

14. The electronic device of claim 11, wherein the display is further configured to display a region on which a previewed image is to be disposed via one of the first summary guide and the second summary guide such that the region is discriminated from other regions.

15. The electronic device of claim 11, wherein the display is further configured to display a region on which at least one shooting-completed image is to be disposed via one of the first summary guide and the second summary guide such that the region is discriminated from other regions.

16. The electronic device of claim 11, wherein the display is further configured to change and display a direction in which one of the first summary guide and the second summary guide is shown depending on at least one of a left and right movement, an up and down movement, and a rotation of the electronic device.

17. The electronic device of claim 12, wherein the processor is further configured to determine whether the electronic device is positioned in one of the outdoor environment and the indoor environment based on a user's selection.

18. The electronic device of claim 11, wherein the processor is further configured to determine whether the electronic device is positioned in one of the outdoor environment and the indoor environment based on an analysis result of at least one of an illuminance, a boundary direction, and a color direction of a previewed image.

19. The electronic device of claim 18, wherein the analysis result comprises an edge orientation histogram (EOH) and a color orientation histogram (COH).

20. The electronic device of claim 11,
wherein, when it is determined that the electronic device is positioned in the outdoor environment, after a number of image shootings corresponding to the outdoor environment are completed, the processor is further configured to generate the spherical panoramic image by combining the shot images,
wherein, when it is determined that the electronic device is positioned in the indoor environment, after a number of image shootings corresponding to the indoor environment are completed, the processor is further configured to generate the spherical panoramic image by combining the shot images, and
wherein the number of shootings corresponding to the indoor environment is greater than the number of shootings corresponding to the outdoor environment.

21. An electronic device comprising:
a processor;
a memory configured to store at least one computer program to be executed by the processor; and
a display configured to display a screen,
wherein the at least one computer program comprises an instruction set configured to:
control the display to display a first summary guide corresponding to an outdoor environment, when it is determined that the electronic device is positioned in the outdoor environment, and
control the display to display a second summary guide corresponding to an indoor environment, when it is determined that the electronic device is positioned in the indoor environment,
wherein the first summary guide and the second summary guide comprise graphic user interfaces (UIs) for informing a spherical panorama shooting progress,
wherein the at least one computer program further comprises an instruction set configured to control the display to display a required number of image shootings corresponding to one of the indoor environment and the outdoor environment, and
wherein the required number of image shootings of the indoor environment is different from the required number of image shootings of the outdoor environment.

* * * * *